June 28, 1927.
V. A. FYNN
1,633,891
NONSYNCHRONOUS MOTOR
Filed Oct. 22, 1926
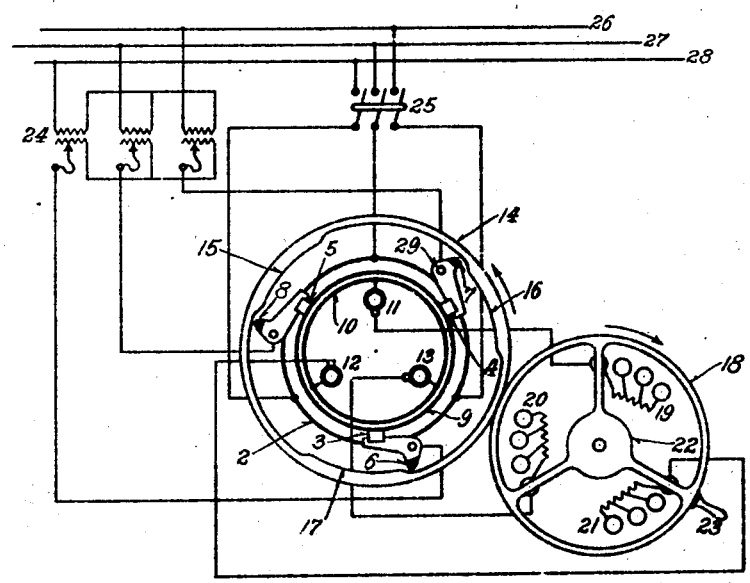
Inventor:
Valère A. Fynn.

Patented June 28, 1927.

1,633,891

UNITED STATES PATENT OFFICE.

VALÉRE A. FYNN, OF ST. LOUIS, MISSOURI.

NONSYNCHRONOUS MOTOR.

Application filed October 22, 1926. Serial No. 143,429.

My invention relates to polyphase induction motors with power factor control and particularly to an improved method and means for starting such motors.

The power factor of a polyphase induction motor can be placed under control by producing at least part of the revolving field of the machine from the secondary. This involves the introduction into polyphase exciting circuits located on the secondary of auxiliary or exciting polyphase currents of proper phase and of the slip frequency of the motor. In some cases these auxiliary currents are derived from the line directly and are, therefore, originally of line frequency. When so derived it is necessary to provide for the conversion of the frequency of said currents from line to slip frequency and this may be done by means of a frequency converter embodied in the motor or separate therefrom. Particularly when the frequency converter is embodied in the motor and the latter is of the slipring type, it will be found that at the moment of starting such a machine unwelcome and destructive sparking will generally take place between the commutator and brushes forming a part of the frequency converter embodied in the motor. This sparking is practically independent of whether or not the commutator brush circuits are closed at starting and is due, at very slow speeds, almost entirely to the voltage or voltages generated in those turns of the commuted winding which are shortcircuited by the individual brushes resting on the commutator. In order to overcome this drawback I have conceived the idea of lifting commutator brushes off the commutator during the starting operation and dropping them back into contact with said commutator after the machine has reached its normal speed or a speed beginning to approach the normal, generally speaking, a speed at which the resultant of the voltages generated in the coils undergoing commutation and of the reactance voltages of said coils has diminished to a value which will not cause harmful sparking.

The objects and features of this invention will more clearly appear from the detailed description taken in conjunction with the accompanying drawing and will be pointed out in the claims.

Referring to the drawing which illustrates a two-pole embodiment of my invention and which shows a three-phase slipring motor, the primary, here the stationary member, carries a three-phase winding 2 adapted to be connected to the mains 26, 27, 28 by means of the switch 25. The secondary, here the rotor, is shown by way of example as carrying two windings, a three-phase working winding 10 connected to the sliprings 11, 12, 13 and through brushes cooperating with said sliprings to the starting resistances 19, 20, 21, and an exciting winding in the form of a commuted winding 9 with which cooperate the brushes 3, 4, 5 held in brush holders each of which is pivoted on a pin 29. The brushes 3, 4, 5 are shown as resting directly on the circle 9 representing the commuted winding, in practice a commutator would, of course, be interposed. These commutator brushes are connected to the adjustable ratio three-phase transformer 24, the primaries of which are connected to the mains. The star-shaped member 22 of the controller is adapted to interconnect the resistances 19, 20, 21, thus completing the circuits of the working winding 10. In the position shown in the figure the member 22 is shown short-circuiting the secondary working winding 10. Each of the brush holders holding the commutator brushes is provided with a horn-like projection 6, 7, 8 of insulating material. A ring-shaped member 14 movable concentrically with the secondary member of the motor, and, therefore, with the commutator carried by said member, is provided with elongated projections 15, 16, 17 adapted to cooperate with the horn-like projections on the brush holders so as to cause the brush holders to pivot on their supporting pins 29 and thus lift the brushes 3, 4, 5 off the commutator or off the winding 9. In the arrangement shown in the figure, the member 14 must be revolved counterclockwise in order to lift the brushes off the winding 9. The star-shaped member 22 in control of the resistances 19, 20, 21 is integral with a ring-shaped member 18 provided with a handle 23 and adapted to engage with and drive the member 14 which is adapted to cooperate with the commutator brush holders of the motor. The resistances 19, 20, 21 may, of course, be replaced by any kind of impedance.

In the figure the exciting winding 9 is shown between the working winding 10 on the secondary and the working winding 2 on the primary. This location of the winding 9 has been selected merely for the sake of a more convenient and more clear illustration of the features of this invention. As a matter of fact it will usually be preferable to locate the secondary working winding 10 between the primary and the other winding on the secondary, as is now well understood, but the present invention is applicable regardless of the relative positions of these three windings and also applies to machines of this type in which the secondary working and the secondary exciting circuits are contrived in one and the same winding on the secondary and whether or not means are provided for excluding working currents from the secondary exciting circuits.

Referring to the operation of the machine, the brushes 3, 4, 5 are so located with reference to the phases of the winding 2 on the primary that when the machine is in operation and the commutator brushes are connected to the transformer 24, the auxiliary currents introduced into the secondary 9 do compensate the machine, that is, do improve its power factor. With the brushes 3, 4, 5 in the correct position and with the member 22 shortcircuiting the secondary working winding 10, the member 14 is located as shown in the figure, namely out of contact with the brush holder horns and so that a movement of the handle 23 in a clockwise direction will bring the projections 15, 16, 17 of the ring 14 into contact with the horns 6, 7, 8 of the brush holders and lift the brushes out of contact with the commuted winding 9 after the handle 23 has moved through more or less of an arc. Thus, the brushes 3, 4, 5 may be lifted before the member 22 leaves those contacts which shortcircuit the winding 10 or after said member has left the contacts in question and has inserted more or less resistance into the circuits including the winding 10, but in all cases the brushes 3, 4, 5 must be lifted off when the winding 10 is on open circuit or when an amount of resistance is included in circuit with said winding which causes the motor speed to fall considerably below the synchronous.

In order to start the machine the handle 23 is moved in a clockwise direction until the circuits of the winding 10 are interrupted or until that amount of resistance is inserted into the circuits of said winding which corresponds to the desired starting torque. At such time the projections 15, 16, 17 will be in operative contact with the horns 6, 7, 8 and the brushes 3, 4, 5 will be lifted off the commuted winding 9. The primary winding 2 may now be connected to the mains by closing the switch 25 and the machine accelerated by moving the handle 23 in a counterclockwise direction until the position shown in the figure is reached. At such time, if not before, the projections 15, 16, 17 break operative connection with the horns 6, 7, 8, the brushes 3, 4, 5 contact with the winding 9 and the power factor of the machine is placed under control and improved.

In the case of slipring induction motors, arrangements are often made to shortcircuit the secondary working winding independently of the sliprings after the machine has been brought up to speed and to then lift the slipring brushes off the sliprings. Such an arrangement can, of course, be combined with the one here described without departing from the spirit of this invention.

Throughout this specification the term primary member is applied to that member which carries the windings connected to the supply, which windings carry the line working currents, and whether or not these primary windings produce the revolving flux of the motor, which flux always revolves synchronously with respect to the primary member. The other member is referred to as secondary whether or not it carries a winding or windings which produce all or a part of the revolving flux.

It is well known that any motor can be operated as a generator, provided it be driven by a prime mover at a suitable speed and it is also generally recognized that nonsynchronous polyphase motors are no exception to this rule.

The arrangement here shown may be applied to nonsynchronous generators with advantage, in case the latter are connected to the mains at speeds materially differing from the synchronous, at which time sparking at the commutator brushes will occur unless the latter are lifted off and not released until the synchronous or a near synchronous speed has been reached.

This invention is also applicable to single phase slipring induction motors started as split-phase motors. The fact that in single phase motors phase compensation is achieved in a totally different manner, namely by injecting into the always present exciting circuit on the secondary an auxiliary voltage intended to modify the phase of the speed field of the machine, is quite immaterial. Such motors carry a commuted winding on the secondary member and if the brushes cooperating with said winding are left down at starting while resistances are inserted into the secondary vicious sparking may result.

It is clear that various changes may be made in the details of this disclosure without departing from the spirit of this invention, and it is, therefore, to be understood that this invention is not to be limited to the specific details here shown and described. In the appended claims I am to cover all the modifications which are within the scope of my invention.

What I claim is:

1. A non-synchronous alternating current motor, having a commuted and a working winding on its secondary, brushes cooperating with the commuted winding, means for introducing impedance into the working winding on the secondary, means for raising the brushes off the commuted winding, and an interlocking device for the two aforesaid means adapted to lift the brushes off the commuted winding some time after the impedance introducing means has been set in motion to increase the impedance of the secondary working winding.

2. A non-synchronous alternating current motor, having working and exciting circuits on the secondary, frequency transforming means in circuit with the secondary exciting circuits and including a commutator and cooperating brushes normally held in contact with said commutator, means for introducing impedance into the working circuits on the secondary, means for raising the brushes off the commutator, and an interlocking device for the two aforesaid means adapted to allow the brushes to rest on the commutator when the secondary working circuits are shortcircuited and to move the brushes out of contact with the commutator when a certain amount of impedance is introduced into the secondary working circuits.

3. A non-synchronous alternating current motor, having working and exciting circuits on the secondary, frequency transforming means in circuit with the secondary exciting circuits and including a commutator and cooperating brushes normally held in contact with said commutator, and means for holding the brushes off the commutator at starting.

4. The method of operating a phase compensated alternating current induction motor having a commutator and cooperating brushes, comprising, starting the machine by impressing an alternating voltage on the primary and introducing impedance into its secondary member, decreasing said impedance and shortcircuiting the secondary member, concurrently interrupting the compensating circuits at starting by lifting the brushes off the winding with which they cooperate, and reestablishing cooperative relation between the commuted winding and the brushes after the machine has reached a sufficient speed.

In testimony whereof I affix my signature this 20th day of October, 1926.

VALÉRE A. FYNN.